United States Patent
Sébire et al.

(10) Patent No.: US 7,756,080 B2
(45) Date of Patent: Jul. 13, 2010

(54) METHOD AND A DEVICE FOR REALLOCATING TRANSPORT FORMAT COMBINATION IDENTIFIERS IN A WIRELESS SYSTEM

(75) Inventors: Benoist Sébire, Tokyo (JP); Iuliana Marinescu, Espoo (FI)

(73) Assignee: Nokia Corporation, Espoo (FI)

( * ) Notice: Subject to any disclaimer, the term of this patent is extended or adjusted under 35 U.S.C. 154(b) by 853 days.

(21) Appl. No.: 10/579,402

(22) PCT Filed: Nov. 10, 2004

(86) PCT No.: PCT/FI2004/000665

§ 371 (c)(1),
(2), (4) Date: Jan. 12, 2007

(87) PCT Pub. No.: WO2005/048563

PCT Pub. Date: May 26, 2005

(65) Prior Publication Data

US 2007/0218883 A1 Sep. 20, 2007

(30) Foreign Application Priority Data

Nov. 12, 2003 (FI) ................................. 20031649

(51) Int. Cl.
*H04W 4/00* (2009.01)
(52) U.S. Cl. ................ 370/329; 370/341; 370/310; 370/230; 370/431; 370/252
(58) Field of Classification Search .......... 370/329, 370/341, 230, 431, 252, 310
See application file for complete search history.

(56) References Cited

U.S. PATENT DOCUMENTS

| | | | | |
|---|---|---|---|---|
| 6,765,887 | B1 * | 7/2004 | Shiu et al. | 370/329 |
| 7,366,094 | B2 * | 4/2008 | Speight | 370/230 |
| 2002/0013147 | A1 | 1/2002 | Fauconnier et al. | 455/422 |
| 2002/0122400 | A1 | 9/2002 | Vayanos et al. | 370/338 |
| 2004/0081103 | A1 | 4/2004 | Sebire | 370/253 |
| 2004/0152468 | A1 | 8/2004 | Sebire | 455/450 |
| 2006/0140115 | A1 * | 6/2006 | Timus et al. | 370/230 |

FOREIGN PATENT DOCUMENTS

| | | |
|---|---|---|
| WO | WO 00/28760 | 5/2000 |
| WO | WO 01/17283 A2 | 3/2001 |
| WO | WO 02/093817 A1 | 11/2002 |
| WO | WO 2004/042987 A1 | 5/2004 |
| WO | WO 2004/068886 A1 | 8/2004 |

\* cited by examiner

*Primary Examiner*—Huy Phan
(74) *Attorney, Agent, or Firm*—Harrington & Smith (57) ABSTRACT

A method and a device for reallocating transport format combination identifiers (TFCI) of transport format combinations (TFC) forming a transport format combination set (TFCS) in a wireless system utilizing flexible layer one (FLO). Whenever a TFC is removed from the TFCS the corresponding TFCI is left vacant. The vacant TFCI is then assigned to a TFC with a subsequent TFCI. Such TFC with subsequent TFCI may be either the closest one to the vacant TFCI (by its TFCI) or the last one, for example. The size of TFCIs may be reduced if enabled by the assigning phase.

18 Claims, 6 Drawing Sheets

PRIOR ART

PRIOR ART

METHOD AND A DEVICE FOR REALLOCATING TRANSPORT FORMAT COMBINATION IDENTIFIERS IN A WIRELESS SYSTEM

FIELD OF THE INVENTION

The present invention relates generally to communication systems. In particular the invention concerns GERAN (GSM/EDGE Radio Access Network) radio access network and air interface thereof in which a special type of physical layer called flexible layer one (FLO) is utilized.

BACKGROUND OF THE INVENTION

Modern wireless communication systems such as GSM (Global System for mobile communications) and UMTS (Universal Mobile Telecommunications System) are capable of transferring various types of data over the air interface between the network elements such as a base station and a mobile station (MS). As the general demand for transfer capacity continuously rises due to e.g. new multimedia services coming available, new more efficient techniques have been developed in order to exploit the existing resources to a maximum extent.

A technical report 3GPP 45.902 [1] discloses a concept of flexible layer one, a new physical layer proposed for the GERAN. The ingenuity of the concept relies on the fact that the configuration of the physical layer including e.g. channel coding and interleaving is specified not until the call set-up. Thus, the support of new services can be handled smoothly without having to specify new coding configuration schemes separately in connection with each release.

Development work of the FLO concept has been provided with somewhat strict requirements. FLO should, for example, support multiplexing of parallel data flows on to a basic physical subchannel and provide optimisation of spectral efficiency through the support of different interleaving depths, unequal error protection/detection, reduced channel coding rate granularity and support of different (8PSK, GMSK etc) modulations. Moreover, the solution shall be future proof and minimize the overhead introduced by the radio protocol stack.

According to the GERAN Release 5 the MAC sublayer (Layer 2 for FLO) handles the mapping between the logical channels (traffic or control) and the basic physical subchannels introduced in 3GPP TS 45.002 [2].

In UTRAN (UMTS Radio Access Network), the MAC utilizes so-called Transport Channels TrCH for transferring data flows with given QoS's (Quality of Service) over the air interface. As a result, several transport channels, that are configured at call set-up, can be active at the same time and be multiplexed at the physical layer.

Now, by adopting the idea of FLO, aforesaid flexible transport channels can be utilized in GERAN as well. Accordingly, the physical layer of GERAN may offer one or several transport channels to the MAC sublayer. Each of these transport channels can carry one data flow providing a certain Quality of Service (QoS). A number of transport channels can be multiplexed and sent on the same basic physical subchannel at the same time.

The configuration of a transport channel i.e. the number of input bits, channel coding, interleaving etc. is denoted as a Transport Format (TF). Furthermore, a number of different transport formats can be associated to a single transport channel. The configuration of the transport formats is completely controlled by the RAN (Radio Access Network) and signalled to the MS at call set-up. Correct interpretation of the TF is crucial at the receiving end as well as the transport format defines the utilized configuration for decoding of the data. When configuring a transport format, the RAN can, for example, choose between a number of predefined CRC (Cyclic Redundancy Check) lengths and block lengths.

On transport channels, transport blocks (TB) are exchanged between the MAC sublayer and the physical layer on a transmission time interval (TTI) basis. For each TTI a transport format is chosen and indicated through the transport format indicator (TFIN). In other words, the TFIN tells which transport format to use for that particular transport block on that particular TrCH during that particular TTI. When a transport channel is inactive, the transport format with a transport block size of zero (empty transport format) is selected.

Only a limited number of combinations of the transport formats of the different transport channels are allowed. A valid combination is called a Transport Format Combination (TFC). The set of valid TFCs on a basic physical subchannel is called a Transport Format Combination Set (TFCS). The TFCS is signalled through Calculated Transport Format Combinations (CTFC).

In order to decode a received sequence the receiver needs to know the active TFC for the radio packet. This information is transmitted in the Transport Format Combination Identifier (TFCI) field. Aforesaid field is basically a layer 1 header and has the same function as the stealing bits in GSM. Each of the TFC within a TFCS is assigned a unique TFCI value and upon receipt of a radio packet this is the first element to be decoded by the receiver. By exploiting the decoded TFCI value the transport formats for the different transport channels can be determined and the actual decoding can start.

In case of multislot operation, there shall be one FLO instance for each basic physical subchannel. Each FLO instance is configured independently by Layer 3 and gets an own TFCS as a result. The number of allocated basic physical subchannels depends on the multislot capabilities of the MS.

For the time being the use of FLO is planned to be limited to dedicated channels only, thus maintaining the 26-multiframe structure for which the SACCH shall be treated as a separate logical channel based on GERAN Release 5.

Figure 1:
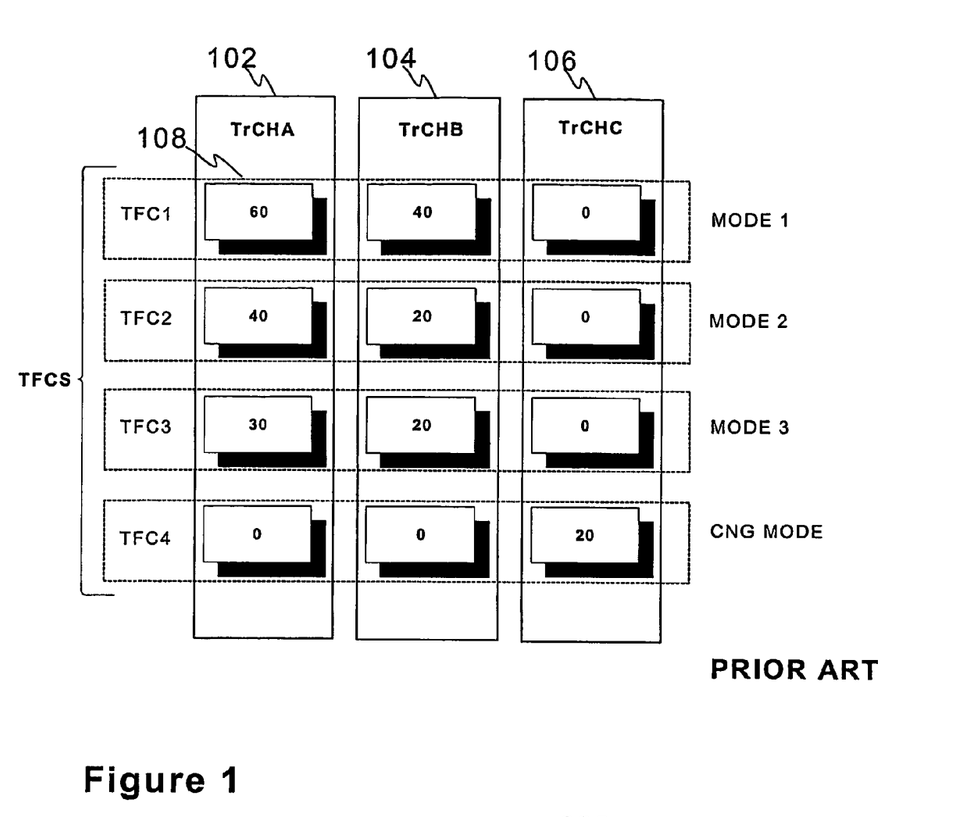

The concept of transport formats and channels as presented in reference [1] is visualized in FIG. 1 where e.g. coded speech is to be transmitted over FLO. Speech is transferred by using three different modes MODE 1, MODE 2, MODE 3 with different bit rates and an additional comfort noise generation mode CNG MODE. Inside a mode the speech bits have been divided into three different classes represented by three transport channels TrCHA 102, TrCHB 104, and TrCHC 106 on the basis of their varying importance during the speech reconstruction stage, for example. Numbers inside the blocks, see e.g. the block pointed by legend 108, being arbitrary in this example though, indicate the required number of bits in a transport channel and codec mode specific manner. Hence, it can be noticed from the figure that TrCHA contains four transport formats (0, 60, 40, 30), TrCHB three transport formats (0, 20, 40) and TrCHC only two formats (0, 20). Resulting transport format combinations TFC1-TFC4, that refer to transport formats on different channels that can be active at the same time, are depicted with dotted lines in the figure. All these valid combinations constitute the TFCS that is signalled through CTFC. An example of CTFC determination is found in reference [1] in addition to techniques applicable in proper TFC selection.

Figure 2:
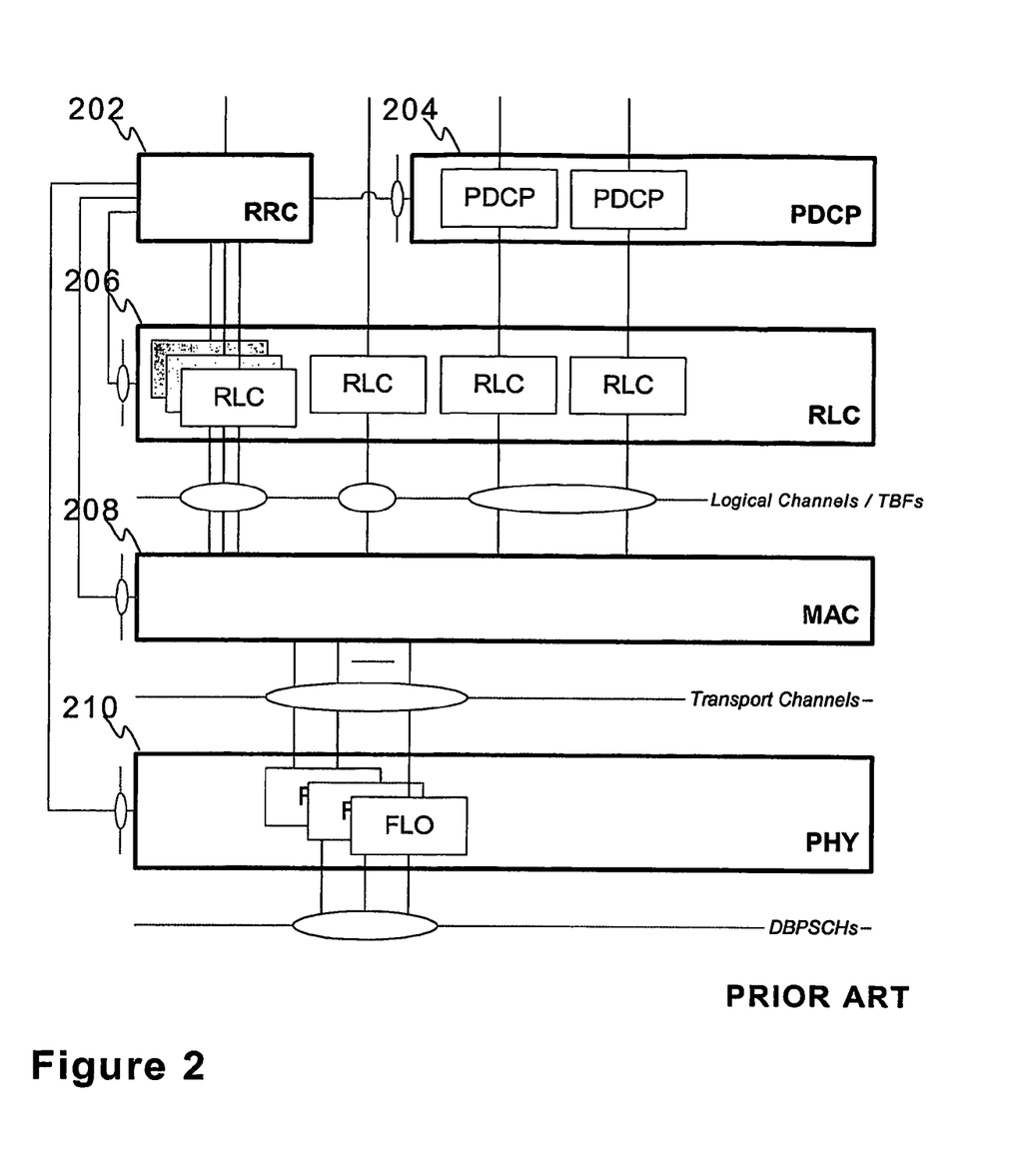
FIG. 2 illustrates FLO protocol architecture in GERAN Iu mode.

A protocol architecture of FLO in case of Iu mode is depicted in FIG. 2 wherein MAC layer 208 maps either a plurality of logical channels or TBFs (temporary block flows)

from RLC entities located in RLC layer 206, said RLC layer 206 receiving data from e.g. PDCP 204 (Packet Data Convergence Protocol) and controlled by RRC (Radio Resource Controller) 202, to physical layer 210. In current specification [1] logical channels are used but are presumably to be replaced with the concept of temporary block flows in the future. TBF concept is described in reference [3] in more detail. A dedicated channel (DCH) can be used as a transport channel dedicated to one MS in uplink or downlink direction. Three different DCHs have been introduced: CDCH (Control-plane DCH), UDCH (User-plane DCH) and ADCH (Associated DCH), the CDCH and UDCH of which used for transmission of RLC/MAC data transfer blocks, whereas the ADCH targeted for transmission of RLC/MAC control blocks. A mobile station may concurrently have a plurality of transport channels active.

Figure 3:
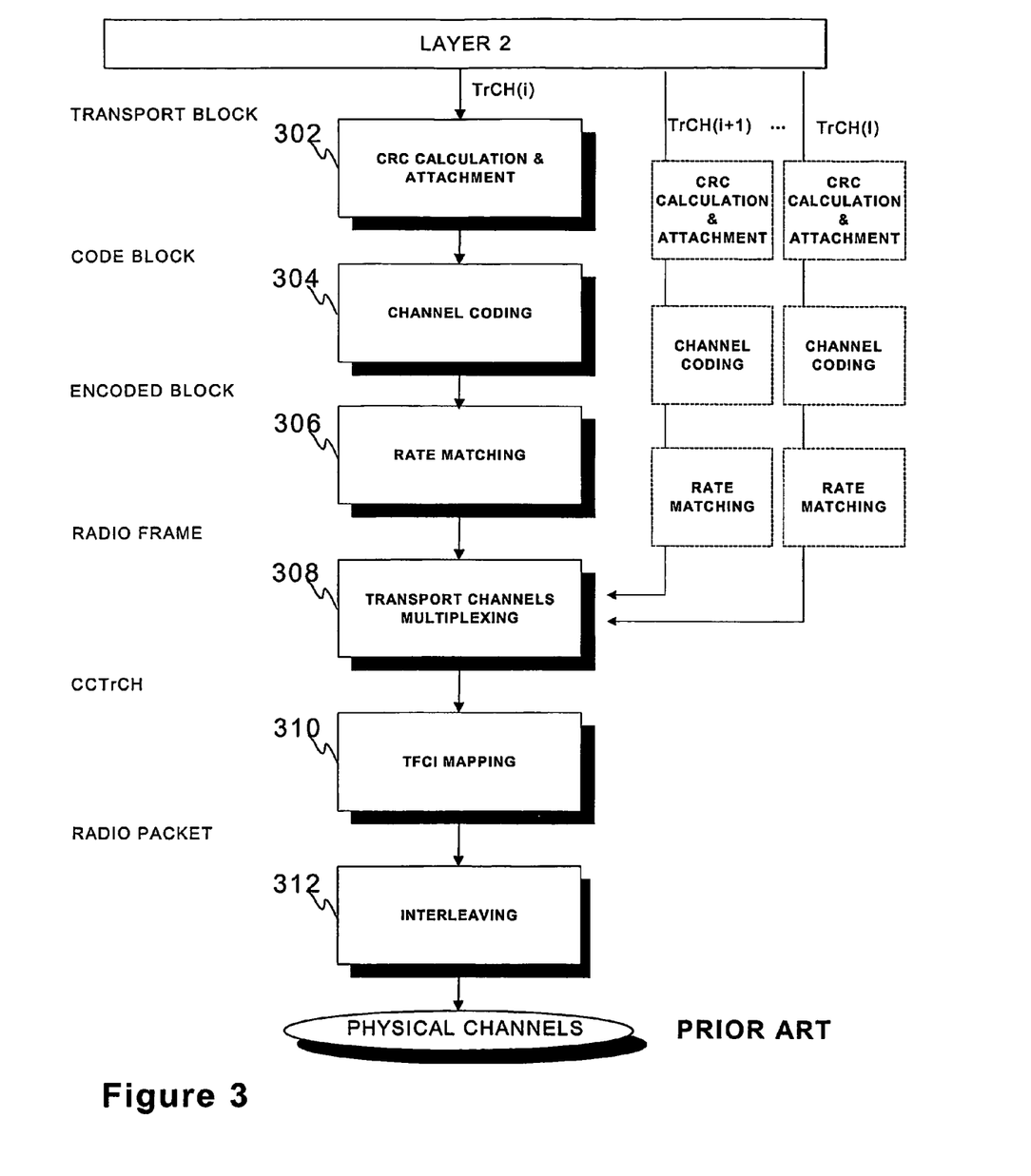
FIG. 3 illustrates FLO architecture.

The FLO architecture is illustrated in FIG. 3 especially in relation to Layer 1 for FLO. In this version only a one-step interleaving has been assumed, i.e. all transport channels on one basic physical subchannel have the same interleaving depth. An alternative architecture with two-step interleaving is disclosed in reference [1] for review. Basic error detection is carried out with a cyclic redundancy check. A Transport Block is inputted to error detection 302 that utilizes a selected generator polynomial in order to calculate the checksum to be attached to the block. Next, the updated block called Code Block is fed into a convolutional channel coder 304 introducing additional redundancy to it. In rate matching 306 bits of an Encoded Block are either repeated or punctured. As the block size can vary, also the number of bits on a transport channel may correspondingly fluctuate. Thereupon, bits shall be repeated or punctured in order to keep the overall bit rate in line with the actual allocated bit rate of the corresponding sub-channel. Output from rate matching block 306 is a called a Radio Frame. Transport channel multiplexing 308 takes care of multiplexing of Radio Frames from active transport channels TrCH(i) ... TrCH(l) received from matching block 306 into a CCTrCH (Coded Composite Transport Channel). In TFCI mapping 310 a TFCI is constructed for the CCTrCH. Size of the TFCI depends on the number of TFCs needed. TFCI size should be minimized in order to avoid unnecessary overhead over the air interface. For example, TFCI of 3 bits can indicate 8 different transport format combinations. If these are not enough, a dynamic connection reconfiguration is needed to be performed. The TFCI is (block) coded and then interleaved 312 with CCTrCH (these two constituting a Radio Packet) on bursts. The selected interleaving technique is configured at call set-up.

RRC layer, Layer 3 for FLO, manages set-up, reconfiguration and release of the traffic channels. Upon creating a new connection, Layer 3 indicates to the lower layers various parameters to configure the physical, MAC and RLC layers. Parameters include the transport channel identity (TrCH Id) and transport format set for each transport channel, transport format combination set through CTFC with modulation parameter etc. In addition, Layer 3 provides transport channel specific parameters such as CRC size, rate matching parameters, transport format dynamic attributes etc. The transport channels and the transport format combination set are separately configurable in the uplink and downlink directions by utilizing e.g. Radio Bearer procedures disclosed in sections 7.14.1 and 7.19 of reference [4] in more detail.

Furthermore, Layer 3 may include information about transport format combination subset(s) to further restrict the use of transport format combinations within the TFCS. Such information may be formed via a "minimum allowed transport format combination index", an "allowed transport format combination list", a "non-allowed transport formation combination list" etc.

Clearly also incremental TFCS reconfiguration should be possible in FLO, i.e. information only about transport channels or TFCs that are added, modified or deleted could be signalled by e.g. modified Radio Bearer signalling. After various reconfigurations, the overall configuration should still be consistent, which could be assured by, for example, removing all TFCs from the TFCS that utilize a transport channel to be released.

However, especially the TFC removal procedure is not at the moment duly optimised in relation to e.g. data transfer. For example, if only one TFC with a certain TFCI is removed from the TFCS, the TFCI is left vacant and the other TFCI-TFC allocations remain intact. Such unused TFCI may thus unnecessarily raise the amount of data to be transferred in every single radio packet as the number of bits required for indicating the TFCI in the packets is adaptive between one and five bits directly depending on the total number of TFCIs. In the worst case, in order to reallocate the TFCIs to the existing TFCs the new TFCs should be signalled by utilizing the lengthy (up to 16 bits) CTFCs that are then assigned a TFCI in the corresponding order, i.e. the first TFC signalled by its CTFC corresponds to TFCI=0 etc. Moreover, the removal of TFCs cannot be regulated in any way by the current procedures.

SUMMARY OF THE INVENTION

The object of the present invention is to optimise the removal of TFC(s) from the TFCS. The object is achieved by automatically reallocating the TFCIs to the remaining TFCs upon removing one or more TFCs from the TCFS. In reallocation, however, some TFC and TFCI associations may remain unchanged, as it is unnecessary to twiddle with TFCIs preceding the one(s) to be removed. For example, if TFCIs from one to ten exist and the original linkage between the fifth one and the corresponding TFC is broken due to the TFC removal, the fifth TFCI and the rest subsequent TFCIs up to nine now, are assigned to TFCs originally associated with TFCIs from six to ten in order to compress the TFCI allocation table. Furthermore, addition/deletion of certain TFCs can be controlled more specifically; for example, the removal of the TFC reserved for signalling (with e.g. TFCI=0) can be restricted in order to maintain functional signalling connection in all circumstances. If after reallocation the size of TFCI may be reduced, it can be done automatically.

The above reallocation and TFCI size alteration procedures may be executed completely automatically; upon receipt of the TFC reconfiguration or corresponding message (sent by a network element/mobile terminal to a mobile terminal/network element, for example) the recipient may perform the procedure without further communication with the sender. If the procedure is made mandatory so that both ends of a connection have to support it, TFC reallocation or TFCI size change do not have to be explicitly signalled between the ends as the same logic is applied in those anyhow. Alternatively or additionally also signalling, for example a parameter in a Radio Bearer message, may be used to indicate e.g. TFCI size reduction if fully automated actions are not preferred. Still further, additional rules for reallocation may be transmitted between the ends of the connection upon change in the rules, in a timed manner etc.

The utility of the invention is based on the fact that by adapting the total number of TFCIs to the prevailing need the overhead over the air interface is in many cases reduced and the TFC management simplified. For optimal link level performance, the less bits used for the TFCI the better. The inventive mechanism is relatively easy to implement and the required new code for executing it does not require a lot of memory; actually some memory is also directly saved on the basis of possibly shortened TFCIs. By further checking and controlling the removal requests for TFCs, one can make sure that at least the signalling data is transferred properly. Moreover, whenever the signalling uses the first TFCI (e.g. TFCI=0), it is not disturbed even if the reallocation of TFCIs otherwise fails with the subsequent TFCIs upon TFC removal.

According to the invention, a method for reallocating transport format combination identifiers (TFCI) of transport format combinations (TFC) upon removal of at least one transport format combination to be performed in a wireless system utilizing a flexible layer one to transfer data over the air interface thereof, where a number of transport formats (TF) indicating configurations of transport channels carrying data flows are included in a transport format combination, the transport format combination belonging to a transport format combination set (TFCS) indicating transport format combinations valid on a certain basic physical subchannel, is characterized in that it has the steps of obtaining information about removal of at least one transport format combination from the transport format combination set in order to determine a first transport format combination identifier become vacant due to the removal of the associated transport format combination, assigning said first vacant transport format combination identifier to a next unremoved transport format combination, if any, having a transport format combination identifier which is subsequent to the removed transport format combination, and likewise assigning the following transport format combination identifiers to further unremoved transport format combinations, if any, thus a number of last transport format combination identifiers previously in use become vacant, and reducing the length of the transport format combination identifiers by an amount dependent on the additional length required to be used to indicate a certain transport format combination identifier if the number of last transport format combination identifiers become vacant still included.

In another aspect of the invention, a method for reallocating a transport format combination identifier (TFCI) of a transport format combination (TFC) upon removal of at least one transport format combination to be performed in a wireless system utilizing a flexible layer one to transfer data over the air interface thereof, where a number of transport formats (TF) indicating configurations of transport channels carrying data flows are included in the transport format combination, the transport format combination belonging to a transport format combination set (TFCS) indicating transport format combinations valid on a certain basic physical subchannel, is characterized in that it has the steps of obtaining information about removal of a transport format combination from the transport format combination set in order to determine a transport format combination identifier become vacant due to the removal of the associated transport format combination, assigning the vacant transport format combination identifier to an unremoved transport format combination having a subsequent transport format combination identifier, and reducing the length of the transport format combination identifiers if enabled by the assigning step.

In a further aspect of the invention, a device operable in a wireless system utilizing a flexible layer one to transfer data over the air interface thereof, where a number of transport formats (TF) are adapted to indicate configurations of transport channels carrying data flows included in a transport format combination (TFC), and the transport format combination is adapted to belong to a transport format combination set (TFCS) indicating transport format combinations valid on a certain basic physical subchannel, the set including one transport format combination with a transport format combination identifier, said device comprising processing means and memory means configured to process and store instructions and data, and data transfer means configured to transfer data, is characterized in that it is arranged to obtain information about removal of at least one transport format combination from the transport format combination set in order to determine a transport format combination identifier become vacant due to the removal of the associated transport format combination, assign the vacant transport format combination identifier to an unremoved transport format combination having a subsequent transport format combination identifier, and reduce the length of the transport format combination identifiers if enabled by the assign procedure.

The term "identifier" refers to either pure numerical value or some other type of identifier like an alphabetic character or string, or a combination of both. In any case, the actual identifier values for a certain identifier type (e.g. a transport format combination identifier) can be sorted based on their properties, i.e. also the following (and the preceding) identifier can be defined to a certain identifier from a group of identifiers.

The term "vacant" TFCI refers herein especially to a TFCI not associated with any TFC. Alternatively, TFCI may be considered as "vacant" if it still has an association with a TFC, but the TFC has already been removed/is to be removed from the TFCS.

The term "subsequent" refers generally to order, and especially to any subsequent item following the item in question, not necessarily just the adjacent (next) one.

In one embodiment of the invention, a mobile terminal exploits the proposed method for reallocating TFCIs. The mobile terminal receives a TFCS reconfiguration message according to which a certain TFC is to be deleted. The terminal, in addition to deleting the TFC, reallocates the TFCIs and minimizes the size thereof. Furthermore, the terminal rejects a request for deleting the TFCI allocated for signalling in order to guarantee functional transfer of signalling data.

Dependent claims disclose embodiments of the invention.

BRIEF DESCRIPTION OF THE DRAWINGS

Hereinafter the invention is described in more detail by reference to the attached drawings, wherein FIG. 1 discloses a visualization of a TFCS structure.

DETAILED DESCRIPTION OF THE EMBODIMENT OF THE INVENTION

FIGS. 1, 2, and 3 were already discussed in conjunction with the description of related prior art.

Figure 4A:
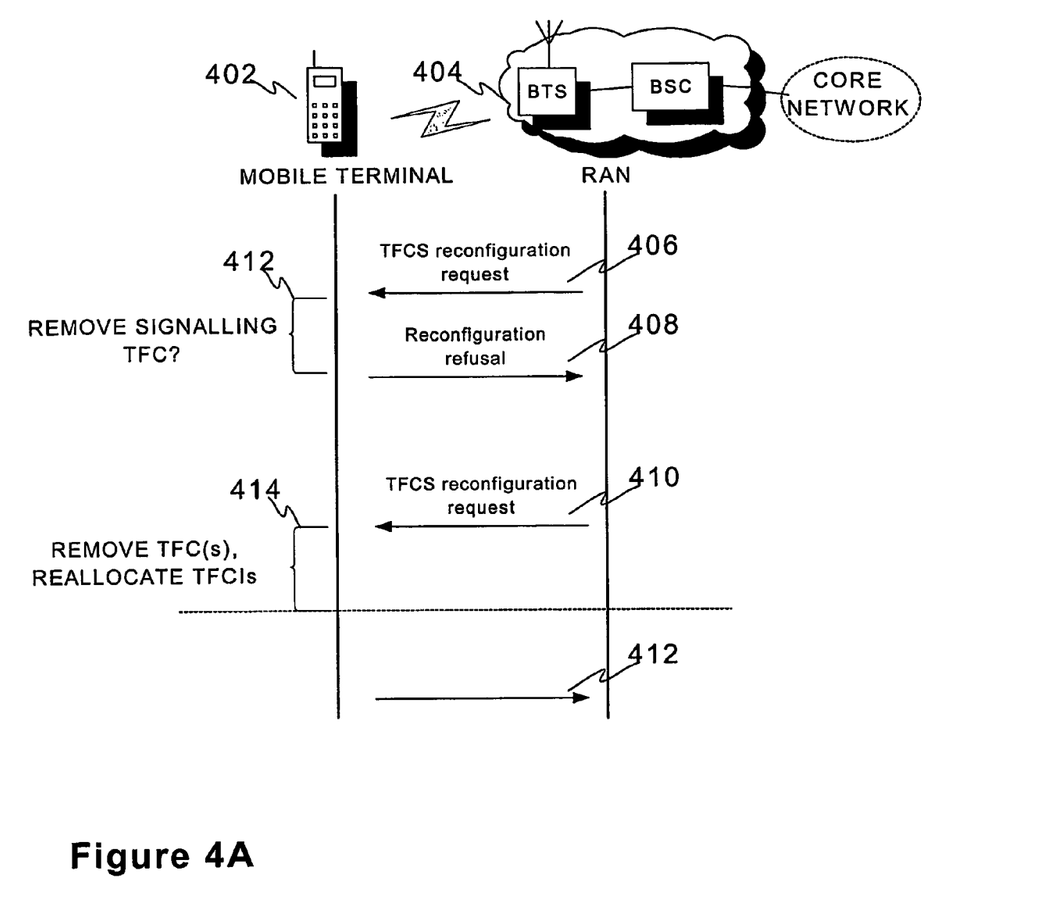
FIG. 4A is a signalling chart of the embodiment of the invention.

FIG. 4A discloses, by way of example only, a signalling chart describing the scenario of the embodiment of the invention in which mobile terminal 402 utilises the current TFCS for sending data in uplink direction to radio access network (e.g. GERAN) 404 in radio packets, every such packet including one or more transport blocks (TB) of a certain transport format constituting a TFC of the current TFCS, the TFC signalled in the packet by TFCI.

Network 404 (e.g. a base station (controller) thereof) first sends a TFCS reconfiguration message to terminal 402 in which removal of a TFC originally allocated for signalling is requested. Terminal 402 is configured to reject deletion of signalling TFC and thus omits the request 412. Terminal may also inform 408 network 404 that a false request has been made. It should be noted that the above analysis and control of TFC removals are, however, not mandatory elements what comes to the reallocation procedure of the invention as such though.

Next, network 404 sends a reconfiguration request 410 to remove three from the total of seven TFCs. Such TFCs to be removed may have been found unnecessary due to changed network conditions etc. As none of the three TFCs relates to signalling this time, they are all removed and TFCIs are reallocated in order to fill the gaps left between the TFCIs in use 414. After removal and reallocation terminal 402 sends 412 uplink data to network 404 in accordance with the revised TFCI allocations.

Figure 4B:
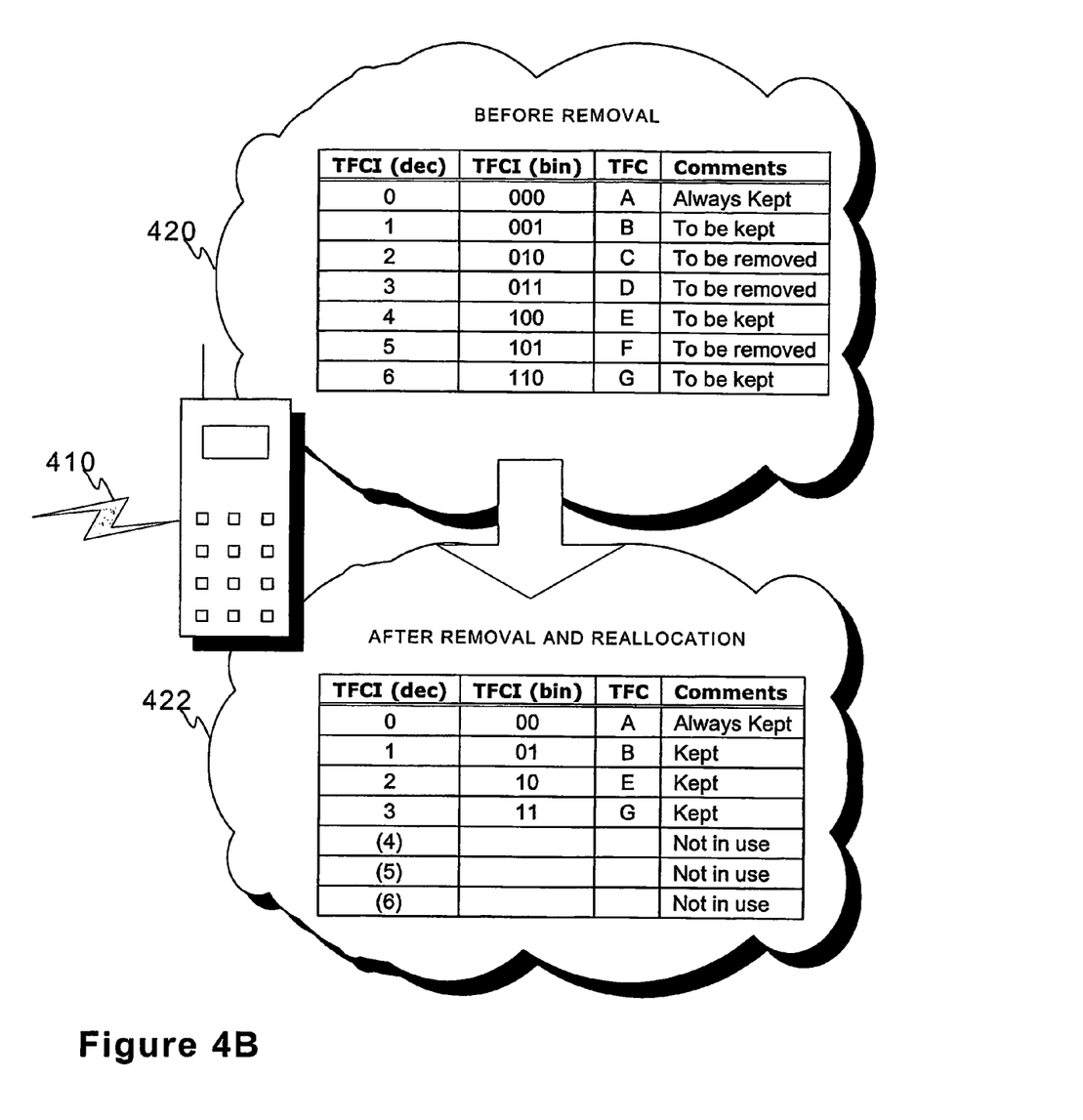
FIG. 4B depicts the TFCI allocations before and after performing the method of the invention.

The same scenario is further visualized in FIG. 4B wherein the TFCI allocations preceding the removal or reallocation are depicted; see reference sign 420. Three TFCs (C, D, and F) to be removed have TFCIs 2, 3, and 5. Notice that the first TFC (A) with TFCI=0 is reserved for signalling use and, in this example, should never be removed from the TFCS. After the desired three TFCs have been removed, the TFCIs left vacant are surrounded by TFCIs for TFCs B, E, and G still in use, namely TFCIs 1, 4, and 6 in addition to the permanent signalling TFCI 0 for signalling TFC A. Therefore, the vacant TFCIs in the middle are reallocated by utilizing a reallocation algorithm described by the following pseudocode:

Phase 1) Mark as vacant the TFCI(s) of the TFC(s) that are/are to be removed.
Phase 2)

```
For TFCIloop=1 to TFCImax
    If TFCIloop is vacant then
        Assign to TFCIloop the first TFC that was not removed (if
        there's any left) and for which the current (old) assigned TFCI >
        TFCIloop.
    End if
End for
```

Phase 3) Depending on the maximum value of the assigned TFCIs, it may be now possible to reduce the number of bits required.

According to the algorithm the TFCIs 1-6 (TFCI valued 0 and optional other permanently allocated TFCIs are left intact) are traversed through in increasing order and upon detecting a vacant TFCI (with "vacant" flag set on, for example), it is assigned to the first remaining TFC for which the current assigned TFCI is higher than the TFCI under reallocation. Phase 2 is repeated until no TFCIs or TFCs left to be reallocated, i.e. all reallocable TFCIs/TFCs have been gone through. As a result, see reference sign 422, the TFCs B, E, and G are now associated with TFCIs 1, 2, and 3 respectively. Finally, as existing four TFCIs that really are assigned require only two bits for unequivocal representation, the length of TFCIs is automatically reduced to two bits instead of original three.

Naturally above principles are not limited to any certain transmission direction or device. They may be used in both uplink and downlink directions and in e.g. a mobile terminal and a network element (e.g. a base station (BS), a base station controller (BSC), or a combination thereof).

Figure 5:
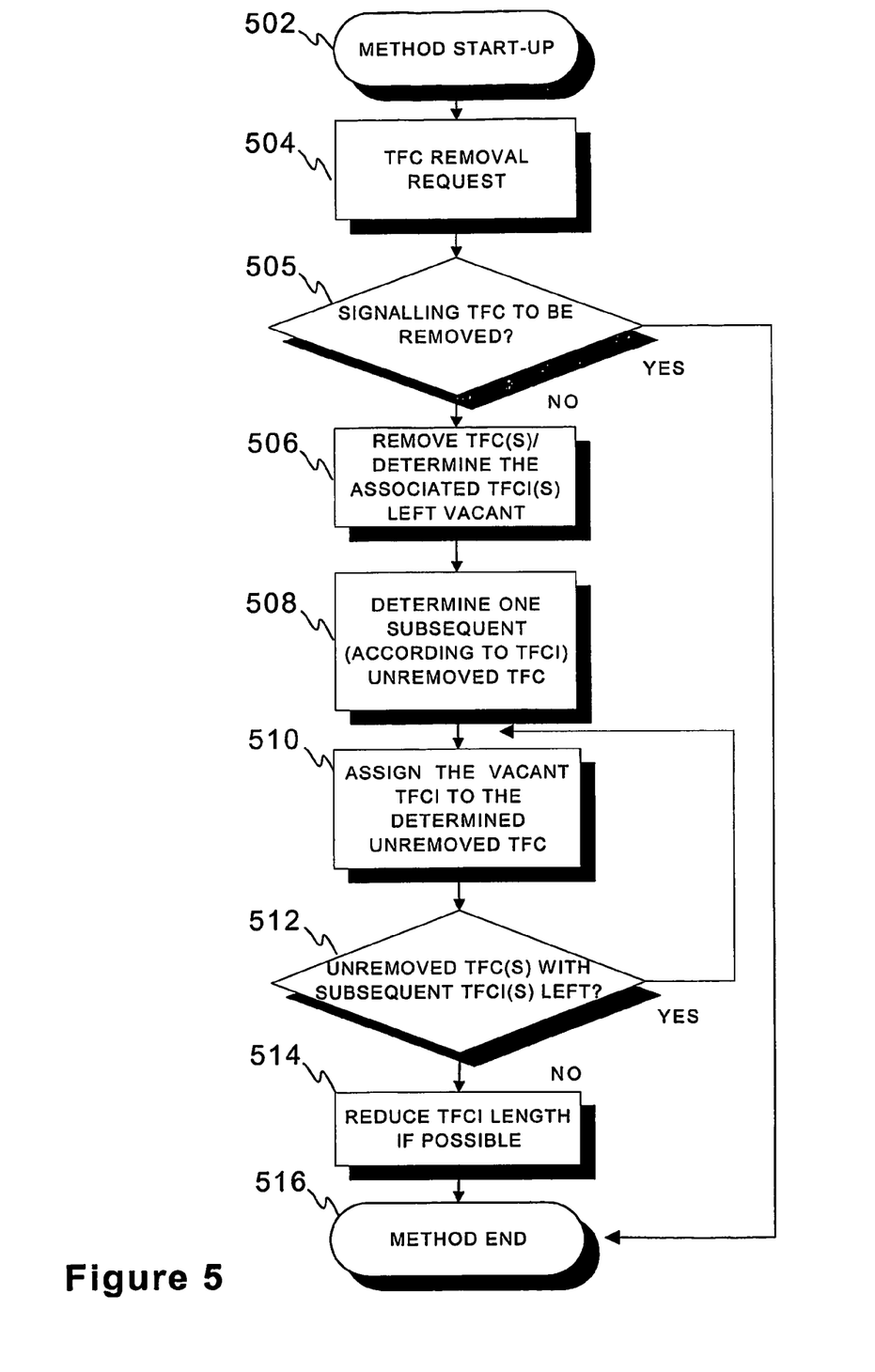
FIG. 5 discloses a flow diagram of the method of the invention.

FIG. 5 discloses a flow diagram of the method of the invention. At method start-up 502 the network entity (e.g. a BS, BSC, or a combination thereof) or a wireless communications device like a mobile terminal may, for example, load the software performing the method of the invention to the memory and start execution. In addition, necessary memory areas can be initialised and communication connections established.

Figure 6:
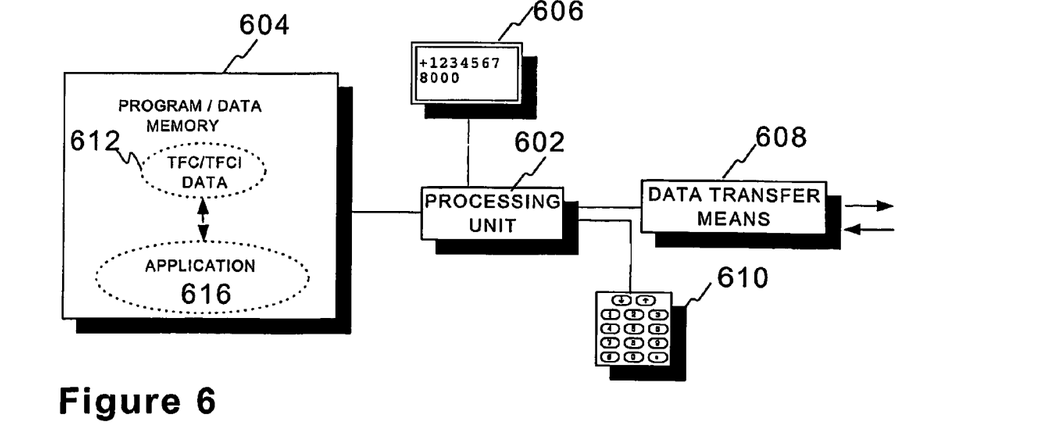
FIG. 6 discloses a block diagram of a device adapted to utilize the invention.

Next, a TFCS reconfiguration message is received from another network entity to be taken into use with a certain connection 504. Alternatively, the entity may itself detect a need for a configuration change and create a new TFCS configuration in which at least one TFC is removed from a TFCS. During optional step 505, it is checked if removal of a TFC (permanently) reserved for signalling is required. If that is the case but, however, not allowed, the method is instantly ended 516 (and the requiring entity may be informed by sending a message). In phase 506, at least the first TFCI(s) previously associated (now vacant) with a removed TFC(s) is determined. In phase 508 the next unremoved TFC with closest subsequent TFCI to the vacant TFCI is determined. Notice that subsequent does not necessarily mean the neighbouring one in every case. For example, in scenario of FIG. 4B TFCs C and D are adjacent what comes to their TFCIs, so TFCI 2 is then to be assigned to the first unremoved TFC, being TFC E in this case, as one with directly adjacent TFCI does not exist. Then, the first (according to the TFCI) vacant TFCI is assigned to the determined TFC in phase 510. In phase 512 it is checked whether more unremoved TFCs with subsequent TFCIs to the one just released exist. If so, the subsequent TFCIs to the first vacant TFCI assigned during the previous step are then assigned to such TFCs. The steps 510 and 512 can be then repeated until all TFCs with subsequent TFCI to the first (originally) vacant TFCI have been associated with some preceding TFCI. Note that the assignation shall apply only for TFC/TFCIs that are not deliberately fixed. The TFCI size is reduced if possible in phase 514. The method is finally ended in phase 516. FIG. 6 depicts one option for basic components of a device like a network element (or a combination of separate elements) or a mobile terminal capable of processing and transferring data in accordance with the invention. Wording "mobile terminal" refers to, in addition to contemporary cellular phones, also to more sophisticated multimedia terminals, hand held and laptop computers etc capable of wireless communication. Memory 604, divided between one or more physical memory chips, comprises necessary code 616, e.g. in a form of a computer program/application, and configuration (TFCI/TFC) data 612. Processing unit 602 is required for the actual execution of the method in accordance with instructions 616 stored in memory 604. Display 606 and keypad 610 are optional components often found useful for providing necessary device control and data visualization means (~user interface) to the user of the device. Data transfer means 608, e.g. a fixed data transmission interface or a radio transceiver or both, are required for handling data exchange, for example, receipt of configuration data from other devices and/or transmission of configuration data to other devices. Code 616 for the execution of the proposed method can be stored and delivered on a carrier medium like a floppy, a CD or a memory card.

The scope of the invention can be found in the following claims. However, utilized devices, method steps, data structures etc may vary significantly depending on the current scenario, still converging to the basic ideas of this invention. For example, when a TFC is removed from the TFCS, the corresponding TFCI may be directly assigned to the unremoved TFC having the last TFCI instead of the first subsequent one. Respectively, in case of multiple TFC removals from a single TFCS, only the vacant TFCIs may be assigned to unremoved TFCs by starting from the TFC with the last TFCI so that in some cases all the TFCI associations between the first released (vacant) and the last TFCI do not change. Alternatively, all the TFCIs starting from the first released one can be reassigned. These two solution models however lost the original ordering of TFCI/TFC allocations, which may not be preferable in every environment. In any case, both ends do always have to apply exactly the same TFCI assignment procedures in order avoid severe transmission problems arising from TFCIs with different meanings at different ends. The update information about the current TFCI (re)allocation method can be transmitted between the network elements and the mobile terminal whenever needed.

REFERENCES

[1] 3GPP TR 45.902 V.6.2.0 Technical Specification Group GSM/EDGE, Radio Access Network; Flexible Layer One (Rel 6)
[2] 3GPP TS 45.002 V6.3.0 Technical Specification Group GSM/EDGE, Radio Access Network; Multiplexing and multiple access on the radio path (Rel 6)
[3] 3GPP TS 44.160 Technical Specification Group GSM/EDGE, General Packet Radio Service (GPRS); Mobile Station (MS)—Base Station System (BSS) interface; Radio Link Control/Medium Access Control (RLC/MAC) protocol Iu mode (Rel 6)
[4] 3GPP TS 44.118 Technical Specification Group GSM/EDGE, Radio Access Network; Mobile radio interface layer 3 specification; Radio Resource Control (RRC) protocol Iu Mode (Rel 5)

The invention claimed is:

1. A method for reallocating transport format combination identifiers of transport format combinations upon removal of at least one transport format combination to be performed in a wireless system utilizing a flexible layer one to transfer data over the air interface thereof, where a number of transport formats indicating configurations of transport channels carrying data flows are included in a transport format combination, the transport format combination belonging to a transport format combination set indicating transport format combinations valid on a certain basic physical subchannel, the method comprises obtaining information about removal of at least one transport format combination from the transport format combination set in order to determine a first transport format combination identifier become vacant due to the removal of the associated transport format combination,
assigning by a device said first vacant transport format combination identifier to a next unremoved transport format combination, if any, having a transport format combination identifier subsequent to the removed transport format combination, and likewise assigning the following transport format combination identifiers to further unremoved transport format combinations, if any, thus a number of last transport format combination identifiers previously in use become vacant, and
reducing the length of the transport format combination identifiers by an amount dependent on the additional length required to be used to indicate a certain transport format combination identifier if the number of last transport format combination identifiers become vacant still included.

2. The method of claim 1, wherein it is further checked whether the removal concerns a transport format combination identifier the removal of which is not allowed, in which case neither the removal nor transport format combination identifier reallocation is performed.

3. The method of claim 2, wherein said transport format combination is reserved for signalling use.

4. The method of claim 3, wherein the transport format combination identifier of said transport format combination is the first one available.

5. The method of claim 1, wherein said wireless system utilizes a GSM/EDGE radio access network.

6. A method for reallocating a transport format combination identifier of a transport format combination upon removal of at least one transport format combination to be performed in a wireless system utilizing a flexible layer one to transfer data over the air interface thereof, where a number of transport formats indicating configurations of transport channels carrying data flows are included in the transport format combination, the transport format combination belonging to a transport format combination set indicating transport format combinations valid on a certain basic physical subchannel, the method comprises obtaining information about removal of a transport format combination from the transport format combination set in order to determine a transport format combination identifier become vacant due to the removal of the associated transport format combination,
assigning by a device the vacant transport format combination identifier to an unremoved transport format combination having a subsequent transport format combination identifier, and
reducing the length of the transport format combination identifiers if enabled by the assigning step.

7. The method of claim 6, wherein said unremoved transport format combination having a subsequent transport format combination identifier is the one with the last transport format combination identifier.

8. The method of claim 7, wherein the length is reduced by an amount dependent on the additional storage space required to be used to indicate a certain transport format combination identifier if the last transport format combination identifier become vacant still included.

9. The method of claim 6, wherein said unremoved transport format combination having a subsequent transport format combination identifier is the one the transport format combination identifier of which is closest to said vacant transport format combination identifier.

10. A device operable in a wireless system utilizing a flexible layer one to transfer data over the air interface thereof, where a number of transport formats are adapted to indicate configurations of transport channels carrying data flows included in a transport format combination, and the transport format combination is adapted to belong to a transport format combination set indicating transport format combinations valid on a certain basic physical subchannel, the set including one transport format combination with a transport format combination identifier, said device comprising processing means and memory means configured to process and store instructions and data, and data transfer means configured to transfer data, the device is arranged to     obtain information about removal of at least one transport format combination from the transport format combination set in order to determine a transport format combination identifier become vacant due to the removal of the associated transport format combination,     assign the vacant transport format combination identifier to an unremoved transport format combination having a subsequent transport format combination identifier, and     reduce the length of the transport format combination identifiers if enabled by the assign procedure.

11. The device of claim 10, further arranged to execute the assign and reduce functionalities by assigning a first vacant transport format combination identifier to a next unremoved transport format combination, if any, having a transport format combination identifier subsequent to the removed transport format combination, and likewise assigning the following transport format combination identifiers to further unremoved transport format combinations, if any, thus a number of last transport format combination identifiers previously in use become vacant, and     by reducing the length of the transport format combination identifiers by an amount dependent on the additional storage space required to be used to indicate a certain transport format combination identifier if the number of last transport format combination identifiers become vacant still included.

12. The device of claim 10, wherein said unremoved transport format combination having a subsequent transport format combination identifier is the one with the last transport format combination identifier.

13. The device of claim 10, wherein said unremoved transport format combination having a subsequent transport format combination identifier is the one the transport format combination identifier of which is closest to said vacant transport format combination identifier.

14. The device of claim 10, arranged to check whether the removal concerns transport format combination the removal of which is not allowed, in which case the device is further arranged to omit the removal of such transport format combination.

15. The device of claim 10 that is a base station, a base station controller, a combination of a base station and a base station controller, or a mobile terminal.

16. The device of claim 10 that is operable in a GSM/EDGE radio access network.

17. A non-transitory medium tangibly encoded with a computer executable program configured to execute, when the computer executable program is run by a processor, a method for reallocating transport format combination identifiers of transport format combinations upon removal of at least one transport format combination to be performed in a wireless system utilizing a flexible layer one to transfer data over the air interface thereof, where a number of transport formats indicating configurations of transport channels carrying data flows are included in a transport format combination, the transport format combination belonging to a transport format combination set indicating transport format combinations valid on a certain basic physical subchannel, the method comprises     obtaining information about removal of at least one transport format combination from the transport format combination set in order to determine a first transport format combination identifier become vacant due to the removal of the associated transport format combination,     assigning said first vacant transport format combination identifier to a next unremoved transport format combination, if any, having a transport format combination identifier subsequent to the removed transport format combination, and likewise assigning the following transport format combination identifiers to further unremoved transport format combinations, if any, thus a number of last transport format combination identifiers previously in use become vacant, and     reducing the length of the transport format combination identifiers by an amount dependent on the additional length required to be used to indicate a certain transport format combination identifier if the number of last transport format combination identifiers become vacant still included.

18. A non-transitory medium tangibly encoded with a computer executable program configured to execute, when the computer executable program is run by a processor, a method for reallocating a transport format combination identifier of a transport format combination upon removal of at least one transport format combination to be performed in a wireless system utilizing a flexible layer one to transfer data over the air interface thereof, where a number of transport formats indicating configurations of transport channels carrying data flows are included in the transport format combination, the transport format combination belonging to a transport format combination set indicating transport format combinations valid on a certain basic physical subchannel, the method comprises     obtaining information about removal of a transport format combination from the transport format combination set in order to determine a transport format combination identifier become vacant due to the removal of the associated transport format combination,     assigning the vacant transport format combination identifier to an unremoved transport format combination having a subsequent transport format combination identifier, and     reducing the length of the transport format combination identifiers if enabled by the assigning step.

* * * * *